United States Patent
Park et al.

(10) Patent No.: US 11,667,818 B2
(45) Date of Patent: Jun. 6, 2023

(54) ETHYLENE-(METH)ACRYLIC ACID COPOLYMER AND WATER-DISPERSIVE COMPOSITION INCLUDING THE SAME

(71) Applicants: SK Innovation Co., Ltd., Seoul (KR); SK Global Chemical Co., Ltd., Seoul (KR)

(72) Inventors: Doh Yeon Park, Daejeon (KR); Ju Eun Jung, Daejeon (KR); Soo Young Hwang, Daejeon (KR); Sang Ha Son, Daejeon (KR); Byoung Kyu Kwak, Daejeon (KR); Hai Jin Shin, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 39 days.

(21) Appl. No.: 17/342,648

(22) Filed: Jun. 9, 2021

(65) Prior Publication Data

US 2021/0388243 A1    Dec. 16, 2021

(30) Foreign Application Priority Data

Jun. 12, 2020 (KR) .................. 10-2020-0071714
Aug. 14, 2020 (KR) .................. 10-2020-0102269

(51) Int. Cl.
| | | |
|---|---|---|
| *C08F 210/02* | (2006.01) | |
| *C08F 220/06* | (2006.01) | |
| *C09J 123/08* | (2006.01) | |
| *C08L 33/02* | (2006.01) | |

(52) U.S. Cl.
CPC ....... *C09J 123/0876* (2013.01); *C08F 210/02* (2013.01); *C08F 220/06* (2013.01); *C08F 2500/33* (2021.01); *C08F 2500/34* (2021.01); *C08F 2800/20* (2013.01); *C08L 33/02* (2013.01)

(58) Field of Classification Search
None
See application file for complete search history.

(56) References Cited

U.S. PATENT DOCUMENTS

| | | | |
|---|---|---|---|
| 5,580,927 | A | 12/1996 | Chou et al. |
| 6,852,792 | B1 | 2/2005 | Capendale et al. |
| 11,168,163 | B2 * | 11/2021 | Zheng ............... C09J 123/0876 |
| 2005/0100754 | A1 | 5/2005 | Moncla et al. |
| 2010/0166991 | A1 | 7/2010 | Hausmann et al. |
| 2016/0145806 | A1 | 5/2016 | Rhee |
| 2018/0265712 | A1 | 9/2018 | van Sluijs et al. |

FOREIGN PATENT DOCUMENTS

| | | |
|---|---|---|
| EP | 2977397 A1 | 1/2016 |
| EP | 3686241 A1 | 7/2020 |
| KR | 1020140115234 A | 9/2014 |
| KR | 101643791 B1 | 7/2016 |
| WO | 0044801 A1 | 8/2000 |
| WO | 2005085331 A1 | 9/2005 |
| WO | 2013099778 A1 | 7/2013 |
| WO | 2017050589 A1 | 3/2017 |

* cited by examiner

*Primary Examiner* — Richard A Huhn
(74) *Attorney, Agent, or Firm* — The Webb Law Firm

(57) ABSTRACT

An ethylene-(meth)acrylic acid copolymer has a portion having a melting temperature of 94° C. or higher. A content of the portion having the melting temperature of 94° C. or higher measured by a Successive Self-nucleation and Annealing (SSA) analysis is 1.5% or less. A water-dispersive composition includes the ethylene (meth)acrylic acid copolymer, a neutralizing agent and an aqueous medium.

13 Claims, 2 Drawing Sheets

ETHYLENE-(METH)ACRYLIC ACID COPOLYMER AND WATER-DISPERSIVE COMPOSITION INCLUDING THE SAME

CROSS-REFERENCE TO RELATED APPLICATIONS

This application claims priority to Korean Patent Applications No. 10-2020-0071714 filed Jun. 12, 2020 and No. 10-2020-0102269 filed Aug. 14, 2020, the disclosures of which are hereby incorporated by reference in their entirety.

BACKGROUND OF THE INVENTION

1. Field of the Invention

The present invention relates to an ethylene-(meth)acrylic acid copolymer and a water-dispersive composition comprising the same

2. Description of the Related Art

For example, an ethylene-carboxylic acid copolymer such as an ethylene-acrylic acid copolymer is used for various products such as a sealing material, an adhesive, a packing material and an optical film. For example, the ethylene-carboxylic acid copolymer may be prepared as an aqueous dispersion and may be used for forming a coating film or an adhesive layer. The aqueous dispersion may be applied to a surface of a polymer film, a paper, a metal foil, a fabric, etc., and then heated to form an adhesive or fused layer.

Additionally, a dispersion containing the ethylene-acrylic acid copolymer may be used to seal a bag formed of a material such as a vinyl or a metal foil. In this case, the dispersion may be applied to a portion of the object, and then a pressing process involving a heating may be performed together with the object.

When the adhesive layer is formed using an aqueous dispersion containing an ethylene-(meth)acrylic acid copolymer, a light transmittance of the adhesive layer may become low due to the opaque aqueous dispersion such as milk. Accordingly, the object in the portion where the adhesive layer is formed may be optically shielded. Further, when a viscosity of the dispersion becomes excessively high, a wettability may be degraded and a uniform sealing layer may not be formed.

In consideration of the above-described aspects, properties of the ethylene-acrylic acid copolymer for forming an aqueous dispersion may be required to have improved transmittance and adhesion.

For example, International Patent Publication Nos. WO2005/085331 and WO2017/050589 disclose a formation of a heat-sealable coating using an aqueous polymer dispersion.

SUMMARY OF THE INVENTION

According to an aspect of the present invention, there is provided an ethylene-(meth) acrylic acid copolymer having improved light-transmittance and adhesion.

According to an aspect of the present invention, there is provided a water-dispersive composition including an ethylene-(meth)acrylic acid copolymer having improved light-transmittance and adhesion.

In an ethylene-(meth)acrylic acid copolymer according to exemplary embodiments, a content of a portion having a melting temperature of 94° C. or higher measured by a Successive Self-nucleation and Annealing (SSA) analysis is 1.5% or less.

In some embodiments, a melt flow index (MFI) of the ethylene-(meth)acrylic acid copolymer measured at 190° C. and 2.16 kg may be in a range from 200 g/10 min to 1,500 g/10 min.

In some embodiments, a content of (meth)acrylic acid in the ethylene-(meth)acrylic acid copolymer is in a range from 15 wt % to 30 wt %, and a content of ethylene is in a range from 70 wt % to 85 wt %.

In some embodiments, a crystallization temperature of the ethylene-(meth)acrylic acid copolymer measured by a differential scanning calorimetry (DSC) analysis may be from 50° C. to 60° C.

In some embodiments, a melting temperature of the ethylene-(meth)acrylic acid copolymer measured by a differential scanning calorimetry (DSC) analysis is from 60° C. to 90° C.

According to exemplary embodiments, a water-dispersive composition includes an ethylene-(meth)acrylic acid copolymer where a content of a portion having a melting temperature of 94° C. or higher measured by a Successive Self-nucleation and Annealing (SSA) analysis is 1.5% or less, a neutralizing agent and an aqueous dispersion medium. a neutralizing agent and an aqueous dispersion medium.

In some embodiments, a solid content of the composition may be in a range from 20% to 50%.

In some embodiments, a transmittance to a light having a wavelength of 600 nm may be 50% or more.

In some embodiments, a viscosity of the composition at 25° C. may be in a range from 100 cP to 10,000 cP.

In some embodiments, the ethylene-(meth)acrylic acid copolymer may have a melt flow index (MFI) in a range from 200 g/10 min to 1,500 g/10 min measured at 190° C. and 2.16 kg.

In some embodiments, a degree of neutralization of acid groups included in the ethylene-(meth)acrylic acid copolymer may be in a range from 25% to 50%.

In some embodiments, the neutralizing agent may include at least one selected from the group consisting of $NH_4OH$, an organic amine, KOH, NaOH, CsOH or LiOH.

In some embodiments, the water-dispersive composition may further include a polyolefin-based polymer.

In an ethylene-(meth)acrylic acid copolymer according to embodiments of the present invention, a relative amount of a portion having a melting temperature of 94° C. or more calculated from a peak area based on a melting temperature by an SSA analysis may be 1.5% or less. Accordingly, an adhesive layer or a sealing layer having a high transmittance may be formed.

Further, increase in viscosity and generation of insoluble components in a thermal process may be suppressed to improve adhesion reliability and uniformity.

DESCRIPTION OF THE INVENTION

<Ethylene-(Meth)Acrylic Acid Copolymer>

An ethylene-(meth)acrylic acid (EAA) copolymer according to embodiments of the present invention may be prepared through a copolymerization reaction using ethylene and (meth)acrylic acid as monomers. The term "(meth) acrylic acid" used in the present application is used to cover both methacrylic acid and acrylic acid, or derivatives thereof (e.g., (meth)acrylate).

Hereinafter, the present invention will be described in detail with reference to the accompanying experimental examples and drawings. However, those skilled in the art will appreciate that such embodiments described with reference to the examples and drawings are provided to further understand the spirit of the present invention and do not limit subject matters to be protected as disclosed in the detailed description and appended claims.

According to exemplary embodiments of the present invention, in the ethylene-(meth)acrylic acid copolymer, a content of a portion having a melting temperature of 94° C. or higher measured by an SSA (Successive Self-nucleation and Annealing) measurement technique may be 1.5% or less.

The SSA (Successive Self-nucleation and Annealing) is a method of preserving crystals crystallized at corresponding temperatures while lowering a temperature in a stepwise manner by a rapid cooling when each step is completed using a Differential Scanning calorimeter (DSC).

For example, when the ethylene-(meth)acrylic acid copolymer is heated and completely melted, then cooled to a specific temperature (T) and gradually annealed, molecules unstable at the temperature (T) are still in a melted state, and only stable molecules are crystallized. A stability to the temperature (T) depends on a polymer distribution of molecules included in the ethylene-(meth)acrylic acid copolymer.

Figure 1:
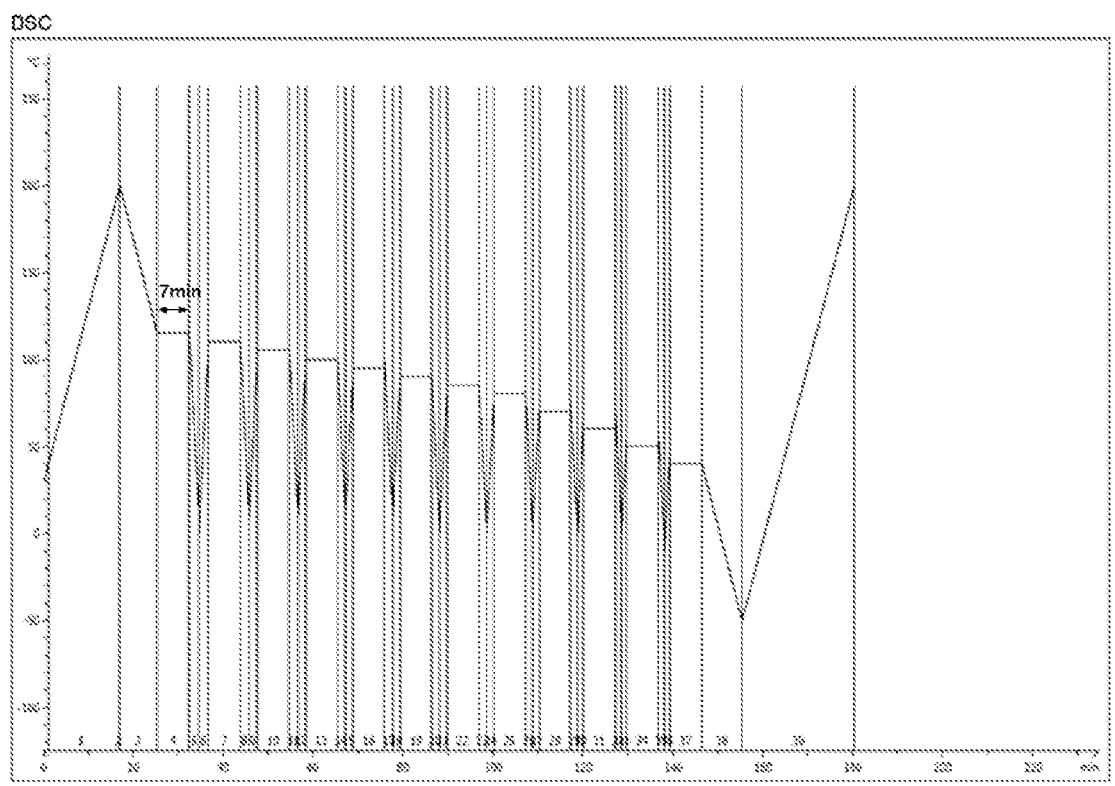
FIG. 1 is a graph showing a temperature profile in a Successive Self-nucleation and Annealing (SSA) analysis in accordance with exemplary embodiments.

Thus, the heat treatments as mentioned above may be performed in a stepwise manner so that a distribution degree according to a polymer chain structure may be quantitatively measured, and thus a distribution of each melting peak area may be measured FIG. 1 is a graph showing a temperature profile in a Successive Self-nucleation and Annealing (SSA) analysis in accordance with exemplary embodiments.

Referring to FIG. 1, the ethylene-(meth)acrylic acid copolymer may be heated in a range from −50° C. to 200° C. using a differential scanning calorimeter (Product name: DSC822e, manufactured by Mettler Toredo). In this step, nitrogen may be supplied as a purge gas at a flow rate of 50 mL/min, and an increasing rate of temperature may be adjusted to 10° C./min. Thus, thermal history of the sample before measurement may be substantially removed.

Next, a stepwise cooling may be performed. For example, the sample is cooled to a temperature less than an initial heating temperature of 200° C. by 85° C. (115° C.), and maintained for 7 minutes. Thereafter, the temperature is lowered to 10° C. and then the temperature is increased again. In this manner, an annealing temperature of the $(n+1)^{th}$ stage is less than an annealing temperature of the $n^{th}$ stage by 5° C. and maintained for another 7 minutes.

The maintenance time and the cooling temperature may be constant and a heating temperature may be gradually lowered. For example, the stepwise cooling may be performed from 200° C. to 40° C. by proceeding 37 step-wise cooling segments. An increasing rate of the temperature and a decreasing rate of the temperature may each be adjusted to 10° C./min.

Lastly, a temperature is raised from −50° C. to 200° C. at a rate of 10° C./min and a change of heat quantity is observed to measure a thermogram so as to quantitatively analyze a distribution of crystals formed by repeating a heating-annealing-rapid cooling.

As described above, the heating-annealing-rapid cooling using the SSA method may be repeated for the ethylene-(meth)acrylic acid copolymer to obtain peaks according to temperatures. A relative content of the peak according to a melting temperature interval may be calculated therefrom. The relative content of the peak may be defined as a ratio of a peak area at a corresponding meting temperature interval (94° C. or more) relative to a crystal melting peak area throughout an entire temperature range.

In exemplary embodiments, a content of a portion having a melting temperature (Tm) of 94° C. or higher measured by the SSA (Successive Self-nucleation and Annealing) measurement may be 1.5% or less, preferably 1% or less, and more preferably 0.5% or less. In an embodiment, the content of the portion having the melting temperature (Tm) of 94° C. or higher may be 0.02% or more.

The content of the portion having the melting temperature (Tm) of 94° C. or higher may be calculated using Equation 1 below.

$$\text{Content having a melting temperature of } 94° \text{ C. or higher} = \frac{\text{Integral value of a peak area corresponding to a melting temperature of } 94° \text{ C. or higher}}{\text{Integral value of an entire peak area}} \quad [\text{Equation 1}]$$

The ethylene-(meth)acrylic acid copolymer according to embodiments of the present invention may have the distribution of the peak area according to the melting temperature as described above to maintain a small amount of comonomers, a low density and a high transparency. Accordingly, a bonding layer or a sealing layer having a high transmittance to light may be formed using a water-dispersive composition including the ethylene-(meth)acrylic acid copolymer.

In exemplary embodiments, a melt flow index (MFI) of the ethylene-(meth)acrylic acid copolymer may be in a range from 200 g/10 min to 1,500 g/10 min under a condition of 190° C. and 2.16 kg.

The melt flow index may indicate a flowability of a polymer at high temperatures. In exemplary embodiments, the melt flow index of the ethylene-(meth)acrylic acid copolymer may be adjusted to 200 g/10 min or more, so that a rapid application and adhesion may be implemented even in a low temperature sealing process. Additionally, a uniform coating layer may be formed due to an increase of meltability or flowability, and stable thermal adhesion may be obtained.

If the melt flow index of the ethylene-(meth)acrylic acid copolymer is excessively increased, heat resistance or mechanical strength of the sealing layer or the bonding layer may be degraded. Thus, according to exemplary embodiments, the melt flow index of the ethylene-(meth)acrylic acid copolymer may be adjusted to 1,500 g/10 min or less.

If the melt flow index of the copolymer exceeds 1,500 g/10 min, the flowability of a product may become excessively high, and a practical fabrication of the product having, e.g., a pellet shape may become difficult.

In a preferable embodiment, the melt flow index of the ethylene-(meth)acrylic acid copolymer may be in a range from 500 g/10 min to 1,200 g/10 min In exemplary embodiments, a content of (meth)acrylic acid (e.g., a (meth)acrylic acid-derived unit or a (meth) acrylic acid-derived block) based on a total weight of the ethylene-(meth)acrylic acid copolymer may range from 15 weight percents (wt %) to 30 wt %. In this case, a content of ethylene (e.g., an ethylene-derived unit or an ethylene-derived block) may range from 70 wt % to 85 wt %.

In a preferable embodiment, the content of (meth)acrylic acid may be in a range from 17 wt % to 28 wt % and the content of ethylene may be in a range from 72 wt % to 83 wt %. More preferably, the content of (meth)acrylic acid may be in a range from 19 wt % to 26 wt % and the content of ethylene may be in a range from 74 wt % to 81 wt %.

If the content of (meth)acrylic acid is relatively small, a water dispersibility of the copolymer may be lowered. If the content of (meth)acrylic acid is high, a process efficiency may be degraded due to a generation of polyacrylic acid, and excessive corrosion of manufacture equipment may be caused. Accordingly, the content of (meth)acrylic acid may be adjusted in the above-described range, so that the adhesion of the coating layer or the sealing layer including the ethylene-(meth)acrylic acid copolymer may be improved.

In exemplary embodiments, a crystallization temperature ($T_c$) of the ethylene-(meth)acrylic acid copolymer measured by a Differential Scanning calorimeter (DSC) method may be in a range from 50° C. to 60° C.

Within the above range, an irregular distribution of the ethylene-(meth)acrylic acid copolymer may be changed to have a regular arrangement due to an intermolecular attraction. Accordingly, the ethylene-(meth)acrylic acid copolymer having high crystallinity and microstructure and having high transmittance may be easily prepared.

Thus, the adhesive layer or the bonding layer having a high light-transmittance may be formed by using a transparent aqueous dispersive composition including the ethylene-(meth)acrylic acid copolymer. Accordingly, a portion of an object on which the bonding layer is formed may not be visually shielded.

In exemplary embodiments, a melting temperature ($T_m$) of the ethylene-(meth)acrylic acid copolymer measured by the Differential Scanning calorimeter (DSC) method may be in a range from 60° C. to 90° C.

The melting temperature ($T_m$) of the ethylene-(meth) acrylic acid copolymer measured by the Differential Scanning calorimeter (DSC) method may be an independent property from the content of the portion having a melting temperature of 94° C. or higher measured by the SSA (Successive Self-nucleation and Annealing) method.

For example, the melting temperature ($T_m$) of the ethylene-(meth)acrylic acid copolymer measured by the Differential Scanning calorimeter (DSC) method may be a temperature at which a solid state is transformed into a fluid liquid state, and may refer to, e.g., a temperature at which a crystallinity may be reduced or removed in a partially crystalline polymer. In the above range of the melting temperature of the ethylene-(meth)acrylic acid copolymer measured by the DSC method, a thermal bonding or a thermal fusing process may be easily performed even at a low temperature.

According to exemplary embodiments of the present invention, a method for preparing the above-described ethylene-(meth)acrylic acid copolymer is provided. In exemplary embodiments, the ethylene-(meth)acrylic acid copolymer may be polymerized in a continuous process using a continuous flow reactor (CSTR).

For example, ethylene and (meth)acrylic acid as a monomer may be introduced into the CSTR reactor together with an initiator. The initiator may include, e.g., a free radical initiator such as an organic peroxide or an azo-based compound.

In some embodiments, a chain transfer agent (CTA) may also be introduced into the reactor. The chain transfer agent may be included to terminate a growing polymer chain to control a final molecular weight distribution. For example, a polymerization reaction of an extending chain may be terminated by the chain transfer agent, and a growth of a new polymer chain may be initiated. The melt flow index of the ethylene-(meth)acrylic acid copolymer may be more easily controlled using the chain transfer agent.

The chain transfer agent may include, e.g., a hydrocarbon-based compound such as pentane, hexane, cyclohexane and isobutane; a ketone-based compound such as acetone, diethyl ketone and methyl ether ketone; an alcohol-based compound such as methanol and ethanol, etc.

In some embodiments, the chain transfer agent may be used as a solvent to transfer ethylene or acrylic acid monomers. The content of the chain transfer agent may be adjusted in a range from 2 to 4 volume percent (vol %) based on a total volume of components introduced into the reactor. Within this range, A sufficiently wide molecular weight distribution may be easily obtained while maintaining the above-described melt flow index range.

In exemplary embodiments, a pressure in the reactor may be maintained in a range from 20,000 psi to 30,000 psi. A temperature in the reactor may be maintained at 200° C. to 260° C. The above-described wide molecular weight distribution and high melt flow index may be easily achieved in the above pressure and temperature range.

A product obtained from the reactor may be processed into, e.g., the form of pellets.

<Water-Dispersive Composition>

According to exemplary embodiments, a water-dispersive composition including the above-described ethylene-(meth) acrylic acid copolymer is provided. The water-dispersive composition may include the ethylene-(meth)acrylic acid copolymer, a neutralizing agent and an aqueous dispersion medium.

As described above, in the ethylene-(meth)acrylic acid copolymer, the content of a portion having a melting temperature of 94° C. or higher as measured by the SSA (Successive Self-nucleation and Annealing) method may be 1.5% or less. The melt flow index (MFI) measured under a condition of 190° C. and 2.16 kg may be 200 g/10 min to 1500 g/10 min, and a crystallization temperature measured by the Differential Scanning calorimetry (DSC) method may be from 50° C. to 60° C. For example, the ethylene-(meth) acrylic acid copolymer may be included in an amount of 5 wt % to 60 wt % based on a total weight of the water-dispersive composition.

Figure 2:
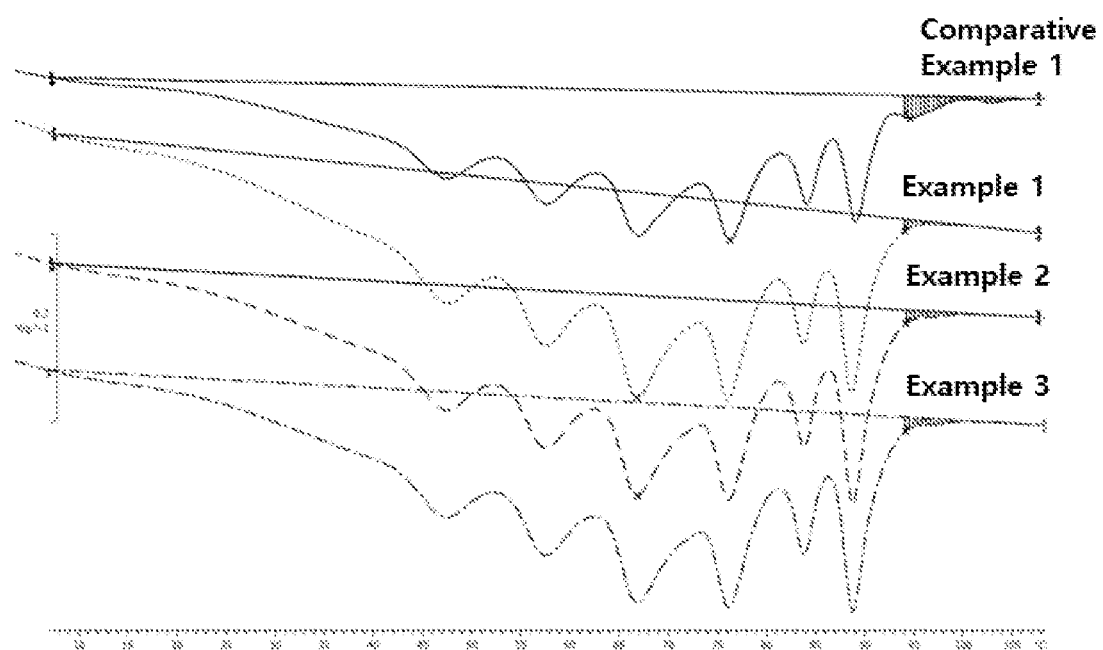
FIG. 2 is a graph showing results of an SSA analysis from ethylene-(meth)acrylic acid copolymers and water-dispersive compositions according to Examples 1 to 3 and Comparative Example 1.

FIG. 2 is a graph showing results of an SSA analysis from ethylene-(meth)acrylic acid copolymers and water-dispersive compositions according to Examples 1 to 3 and Comparative Example 1.

Referring to FIG. 2, a ratio of a peak area in a specific melting temperature interval relative to an area of a crystal melting peak throughout an entire temperature range is calculated for a hatched portion of 94° C. or higher.

As described above, a thermogram is measured by observing a change of heat quantity to quantitatively analyze a distribution of crystals formed by repeated heating-annealing-rapid cooling (quenching). For example, in FIG. 2, a horizontal axis represents a temperature and a vertical axis represents an amount of exothermic heat flow, so that the change of heat quantity according to temperature can be measured.

When the heating-annealing-rapid cooling is repeated with respect to the ethylene-(meth)acrylic acid copolymer and the water-dispersive composition according to exemplary embodiments using the SSA method, peaks according to temperatures are obtained, and a relative content of the peak according to the melting temperature interval can be calculated therefrom. In this case, the relative content of the peak may be defined as a ratio of a peak area in a corresponding melting temperature interval (94° C. or higher) relative to an area of crystal melting peaks in an entire temperature range.

In exemplary embodiments, the content of the portion having a melting temperature of 94° C. or higher may be 1.5% or less. Thus, the bonding layer or the sealing layer having high transmittance to light may be obtained from the water-dispersive composition including the ethylene-(meth)acrylic acid copolymer.

The neutralizing agent may be mixed with the ethylene-(meth)acrylic acid copolymer so that the water-dispersive composition may be prepared as a stable viscous fluid.

An alkaline compound may be used as the neutralizing agent. In a preferable embodiment, the neutralizing agent may include an organic-based alkaline compound such as ammonium hydroxide or an amine-based compound. Alternatively, the neutralizing agent may include an inorganic alkaline compound such as KOH, NaOH, CsOH, or the like. These may be used alone or in a combination thereof.

As a degree of neutralization of the ethylene-(meth)acrylic acid copolymer becomes greater, dispersibility of the water-dispersive composition may be increased, and an amount of non-dispersible components may be reduced. However, as the degree of neutralization of the ethylene-(meth)acrylic acid copolymer becomes greater, a viscosity of the water-dispersive composition may be increased to degrade coating and bonding properties.

However, according to exemplary embodiments, the ethylene-(meth)acrylic acid copolymer having a relatively high melt flow property may be used. Thus, a sufficient degree of neutralization may be achieved while preventing excessive increase of the viscosity.

The term "degree of neutralization" used herein may indicate a ratio of acid groups (carboxylic groups) reacted or neutralized by the neutralizing agent among total acid groups included in the ethylene-(meth)acrylic acid copolymer.

In some embodiments, the degree of neutralization of the water-dispersive composition may be in a range from 25% to 50%. If the degree of neutralization is less than 25%, sufficient dispersibility and coating uniformity may not be obtained. If the degree of neutralization exceeds 50%, the viscosity of the composition may be excessively increased.

Preferably, the degree of neutralization of the water-dispersive composition may be in a range from 25% to 40%. Within this range, the viscosity increase may be suppressed, and the coating uniformity may be further enhanced.

In exemplary embodiments, a transmittance of the water-dispersive composition to a light having a wavelength of 600 nm may be 50% or more. The transmittance may be measured by a spectrophotometer. The water-dispersive composition may have high transmittance not only for the light having the wavelength of 600 nm, but also for light in an entire visible region.

For example, a conventional water-dispersive composition containing an ethylene-(meth)acrylic acid copolymer having a high acid content is opaque like milk and has low light transmittance. However, the transparent bonding layer or sealing layer that has the high transmittance so as not to shield an object may be formed using the water-dispersive composition according to exemplary embodiments of the present invention.

In exemplary embodiments, a viscosity of the water-dispersive composition measured at 25° C. may be in a range from 100 cps to 10,000 cps. Preferably, the viscosity of the water-dispersive composition measured at 25° C. may be in a range from 100 cps to 2,500 cps.

Within the above viscosity range, the water-dispersive composition from which the uniform bonding layer or sealing layer can be formed may be provided.

In some embodiments, the water-dispersive composition may include an additional polymer or resin without degrading features of the ethylene-(meth)acrylic acid copolymer including low temperature bonding, high dispersion and low viscosity properties.

For example, a polyolefin-based resin such as polyethylene, polypropylene, etc., may be added without deteriorating an acid value and the viscosity of the ethylene-(meth)acrylic acid copolymer.

In an embodiment, a solid content based on a total weight of the water-dispersive composition may be in a range from 20% to 50%, preferably from 30% to 40%. Within this range, volatile components may be easily removed at low temperature to obtain the bonding layer or the sealing layer having a high transmittance.

The water-dispersive composition may be used as a sealant of a packaging film including, e.g., polyethylene, polypropylene, polymethylmethacrylate, polyethylene terephthalate, etc. For example, the water-dispersive composition may be coated on a sealing surface of the packaging film, and then thermally pressed to form the sealing layer or the bonding layer easily.

As described above, the ethylene-(meth)acrylic acid copolymer or the water-dispersive composition may have a transmittance of 50% or more to a light corresponding to a wavelength of 600 nm, so that the bonding layer having the high transmittance in a visible region may be formed.

The water-dispersive composition may be coated on various objects such as paper, a resin film, a metal foil, etc., to form an insulation structure such as an adhesive layer, an anti-static layer, an encapsulation layer, etc.

The water-dispersive composition may further include an additive without degrading, e.g., dispersive or thermal properties of the ethylene-(meth)acrylic acid copolymer. For example, the additive may include an anti-static agent, a surfactant, an inorganic particle, an anti-blocking agent, etc. or combination thereof.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Ethylene-(Meth)Acrylic Acid Copolymer

Ethylene and acrylic acid (AA) as monomers, t-butyl peroctoate as an initiator, and isobutane as a chain transfer agent were continuously injected into a continuous stirred tank reactor (CSTR) with a constant input ratio to prepare an ethylene-acrylic acid copolymer. Specifically, a weight ratio of AA in the copolymer was controlled to be 19 wt % to 20 wt %, and an initiator efficiency (i.e., an amount of the initiator for producing 1 kg of the copolymer) was adjusted to 1 g to 2 g. A volume ratio of the chain transfer agent based on a total volume of the components was 6 vol %.

A pressure of the reactor was maintained within 30,000 psi to 32,000 psi, and a temperature in the reactor was maintained within 240° C. to 260° C. An outlet gas temperature from a compressor was 70° C.

A copolymer product was separated and formulated as a pellet through an extruder.

(2) Measuring Properties of Ethylene-(Meth)Acrylic Acid Copolymer

1) Measuring Content of Acrylic Acid (AA %)

An acrylic acid content (AA %) in the EAA copolymer was measured using a Fourier Transform Infrared Spectroscopy. Deuterated triglycine sulfate was used as a detecting group and specific values were obtained from Resolution-Pro™ Software (Agilent).

Specifically, 120 mg sample of the EAA copolymer as the pellet shape was pressed in a hydraulic type hot press (130° C.) for 30 seconds to prepare a 50 μm sheet. A background spectrum was measured, and then the sheet was fixed in the middle of a film holder through which an IR beam passed. Measurements were performed by a transmissive mode and 32 scans of a repeating number.

3 standard samples, acrylic acid contents of which were known were also pre-treated as described above, and a first-order calibration equation of a C—O peak integral value with respect to the acrylic acid content was derived. A C—O peak integral value of the sample was substituted into the calibration equation to obtain an acrylic acid content (%).

2) Measuring of Melt Flow Index (MFI)

An MFI was measured based on ASTM D1238 at 125° C. and a load of 2.16 kg. An MFI under a condition of 190° C. and 2.16 kg was calculated using 20 times correlation with respect to the measuring value based on ASTM D1238 (125° C. and 2.16 kg).

3) Measuring Melting Temperature (Tm)

A melting temperature was measured using a differential scanning calorimeter (DSC822e manufactured by Mettler Toledo).

Specifically, 6 mg sample of the EAA copolymer as the pellet shape was put in an aluminum crucible which was covered by a lid including pinholes.

Nitrogen as a purge gas was introduced by a flow rate of 50 mL/min. A temperature was increased at a rate of 10° C./min within a range of −50° C. to 200° C. (a first temperature increase period), and maintained at 200° C. for 1 minute. The sample was crystallized by cooling from 200° C. to 50° C. at a rate of 5° C./min. In a second temperature increase period, the temperature was changed from −50° C. to 200° C. at a rate of 10° C./min. A temperature of a melting peak at the second temperature increase period was measured as the melting temperature (Tm).

4) Measuring Crystallization Temperature (Tc)

A crystallization temperature was measured using a differential scanning calorimeter (DSC822e manufactured by Mettler Toledo).

Specifically, 6 mg sample of the EAA copolymer as the pellet shape was put in an aluminum crucible which was covered by a lid including pinholes.

Nitrogen as a purge gas was introduced by a flow rate of 50 mL/min. A temperature was increased at a rate of 10° C./min within a range of −50° C. to 200° C. (a first temperature increase period), and maintained at 200° C. for 1 minute. The sample was crystallized by cooling from 200° C. to 50° C. at a rate of 5° C./min. A temperature of a crystallization peak at a first cooling period was measured as the crystallization temperature (Tc).

5) Measuring a Content (%) of a High-Density Portion (a Portion Having a Melting Temperature of 94° C. or Higher)

The content of the high-density portion was measured by a peak segment and an SSA (Successive Self-nucleation/Annealing) using a differential scanning calorimeter (DSC822e manufactured by Mettler Toledo).

Specifically, 10 mg sample of the EAA copolymer as the pellet shape was put in an aluminum crucible which was covered by a lid including pinholes.

Measurements were performed using 39 segments while introducing nitrogen as a purge gas by a flow rate of 50 mL/min. A temperature was increased at a rate of 10° C./min within a range of −50° C. to 200° C. (a first temperature increase period) to remove a thermal history of the sample, and then a stepwise cooling was performed using 37 segments (2nd~38th). A constant temperature period of 7 minutes and a quenching step were inserted in the cooling step to enhance a peak resolution.

A temperature profile from the SSA analysis was obtained as shown in FIG. 1.

(3) Preparation of Water-Dispersive Composition 251 g of water was filled in a 1,000 mL glass double jacket (Autoclave) container. 75 g of the EAA copolymer was input, and 10.1 g of 29 wt % ammonia water as a neutralizing agent was input while stirring. The container was closed and heated to 110° C. while continuously stirring.

After 1 hour, the container was cooled to 60° C., and non-dispersible components were filtered and removed.

Example 2

An ethylene-(meth)acrylic acid copolymer and a water-dispersive composition were prepared by the same method as that of Example 1 except that the temperature in the reactor was maintained within 243° C. to 260° C.

Example 3

An ethylene-(meth)acrylic acid copolymer and a water-dispersive composition were prepared by the same method as that of Example 1 except that the outlet gas temperature from the compressor was maintained as 65° C. and the temperature in the reactor was maintained within 240° C. to 256° C.

Comparative Example 1

An ethylene-(meth)acrylic acid copolymer and a water-dispersive composition were prepared by the same method as that of Example 1 except that the outlet gas temperature from the compressor was maintained as 30° C.

Properties of the copolymers included in the water-dispersive compositions of Examples and Comparative Example are shown in Table 1 below.

TABLE 1

|  | Acid content (AA %) | MFI (g/10 min) | Content of the portion having Tm 94° C. or higher (%) | Tm (DSC measurement, ° C.) | Tc (° C.) |
| --- | --- | --- | --- | --- | --- |
| Example 1 | 19.8 | 244 | 0.42 | 78.2 | 57.2 |
| Example 2 | 19.9 | 243 | 0.13 | 78 | 56.1 |
| Example 3 | 20 | 305 | 0.03 | 76.5 | 53.3 |
| Comparative Example 1 | 19.9 | 229 | 2.04 | 77.5 | 60.9 |

Evaluation on Properties of Water-Dispersive Composition

1) Measuring Transmittance

Transmittances of the water-dispersive compositions of Examples and Comparative Example were measured using a spectrophotometer. Specifically, distilled water was added to a 10 mm measuring cell and calibrated so that the transmittance was set as 100%. Thereafter, about 8 ml of the water-dispersive composition was put in the same cell after being dried, and irradiated with light to measure the transmittance at a wavelength of 600 nm.

2) Measuring Viscosity

Viscosities at 25° C. of the water-dispersive compositions of Examples and Comparative Example after adding the neutralizing agent were measured using a viscometer (Brookfield DV-II, Rotor No. 52).

The results are shown in Table 2 below.

TABLE 2

|  | Transmittance | Viscosity (cP) |
| --- | --- | --- |
| Example 1 | 52.7% | 273 |
| Example 2 | 67.1% | 304 |
| Example 3 | 68.3% | 687 |
| Comparative Example 1 | 26.4% | 627 |

Referring to Table 2, the water-dispersive compositions of Examples provided the transmittances greater than that from Comparative Example.

What is claimed is:

1. An ethylene-(meth)acrylic acid copolymer, wherein a content of a portion having a melting temperature of 94° C. or higher measured by a Successive Self-nucleation and Annealing (SSA) analysis is 1.5% or less.

2. The ethylene-(meth)acrylic acid copolymer of claim 1, wherein a melt flow index (MFI) measured at 190° C. and 2.16 kg is in a range from 200 g/10 min to 1,500 g/10 min.

3. The ethylene-(meth)acrylic acid copolymer of claim 1, wherein a content of (meth)acrylic acid is in a range from 15 wt % to 30 wt %, and a content of ethylene is in a range from 70 wt % to 85 wt %.

4. The ethylene-(meth)acrylic acid copolymer of claim 1, wherein a crystallization temperature measured by a differential scanning calorimetry (DSC) analysis is from 50° C. to 60° C.

5. The ethylene-(meth)acrylic acid copolymer of claim 1, wherein a melting temperature measured by a differential scanning calorimetry (DSC) analysis is from 60° C. to 90° C.

6. A water-dispersive composition, comprising:
an ethylene-(meth)acrylic acid copolymer, wherein a content of a portion having a melting temperature of 94° C. or higher measured by a Successive Self-nucleation and Annealing (SSA) analysis is 1.5% or less;
a neutralizing agent; and
an aqueous dispersion medium.

7. The water-dispersive composition of claim 6, wherein a solid content of the composition is in a range from 20% to 50%.

8. The water-dispersive composition of claim 6, wherein a transmittance to a light having a wavelength of 600 nm is 50% or more.

9. The water-dispersive composition of claim 6, wherein a viscosity of the composition at 25° C. is in a range from 100 cP to 10,000 cP.

10. The water-dispersive composition of claim 6, wherein the ethylene-(meth)acrylic acid copolymer has a melt flow index (MFI) in a range from 200 g/10 min to 1,500 g/10 min measured at 190° C. and 2.16 kg.

11. The water-dispersive composition of claim 6, wherein a degree of neutralization of acid groups included in the ethylene-(meth)acrylic acid copolymer is in a range from 25% to 50%.

12. The water-dispersive composition of claim 6, wherein the neutralizing agent includes at least one selected from the group consisting of $NH_4OH$, an organic amine, KOH, NaOH, CsOH or LiOH.

13. The water-dispersive composition of claim 6, further comprising a polyolefin-based polymer.

* * * * *

UNITED STATES PATENT AND TRADEMARK OFFICE
CERTIFICATE OF CORRECTION

| | | |
|---|---|---|
| PATENT NO. | : 11,667,818 B2 | Page 1 of 1 |
| APPLICATION NO. | : 17/342648 | |
| DATED | : June 6, 2023 | |
| INVENTOR(S) | : Park et al. | |

It is certified that error appears in the above-identified patent and that said Letters Patent is hereby corrected as shown below:

On the Title Page

Column 1, item (71) Applicants, Line 2, delete "SK Global Chemical Co., Ltd.," and insert -- SK Geo Centric Co., Ltd., --

Signed and Sealed this
Twenty-fifth Day of July, 2023

Katherine Kelly Vidal
*Director of the United States Patent and Trademark Office*